United States Patent [19]

Jensen et al.

[11] 4,222,538
[45] Sep. 16, 1980

[54] PIPE ANCHOR

[75] Inventors: Finn Jensen, Dolton, Ill.; Theodore J. Sweger, Lake Worth, Fla.

[73] Assignee: Illinois Railway Equipment Company, Chicago, Ill.

[21] Appl. No.: 4,694

[22] Filed: Jan. 19, 1979

[51] Int. Cl.² ............................. F16L 5/00; F16L 3/08
[52] U.S. Cl. ................................... 248/56; 248/74 R
[58] Field of Search ................................... 248/56–58, 248/62, 74 R

[56] References Cited

U.S. PATENT DOCUMENTS

| | | | |
|---|---|---|---|
| 1,821,295 | 9/1931 | Dieter | 248/56 |
| 2,454,064 | 11/1948 | Johnson | 248/74 R |
| 2,546,792 | 3/1951 | Smith et al. | 248/58 |
| 2,625,354 | 1/1953 | Smith | 248/58 |
| 4,102,524 | 7/1978 | Cseri | 248/56 |

*Primary Examiner*—James C. Mitchell
*Attorney, Agent, or Firm*—Lockwood, Dewey, Alex & Cummings

[57] ABSTRACT

Pipe anchor for anchoring pipes to structural members and particularly for anchoring air lines and train pipes to structural members in the underframes of railway cars. Each anchor is a combination of three cooperating parts, namely, an adapter, a base, and a clamp. The adapter is the part that is attached to a structural member preferably by welding. The base is in the form of a saddle which seats on the pipe-engaging section of the adapter and has opposed sides which embrace a pipe on opposite sides and terminate in outturned, inclined, longitudinal flanges. The clamp engages the pipe diametrically opposite from the adapter and has inwardly opening inclined, longitudinal channels adapted to slide over the outturned flanges and draw the three-part assembly into equi-spaced four-point embracing support contact with the pipe.

7 Claims, 18 Drawing Figures

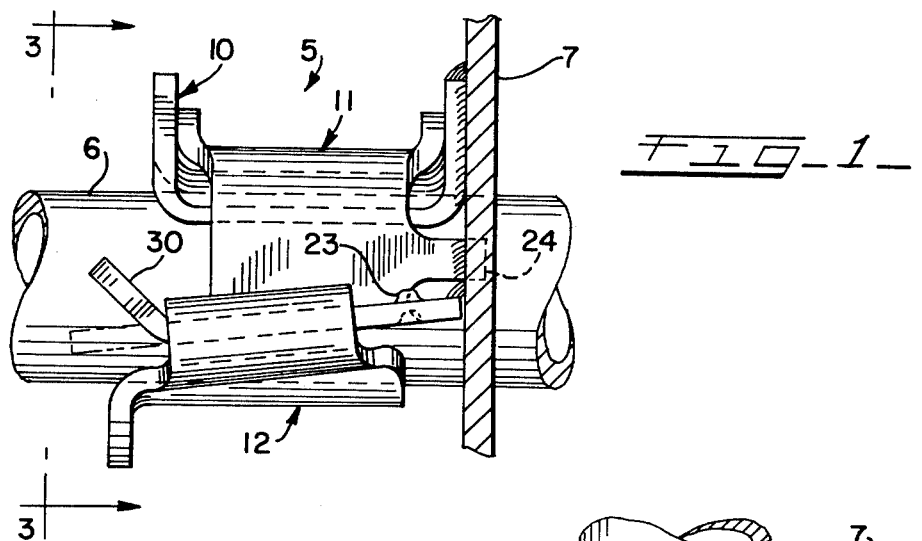
FIG_1_
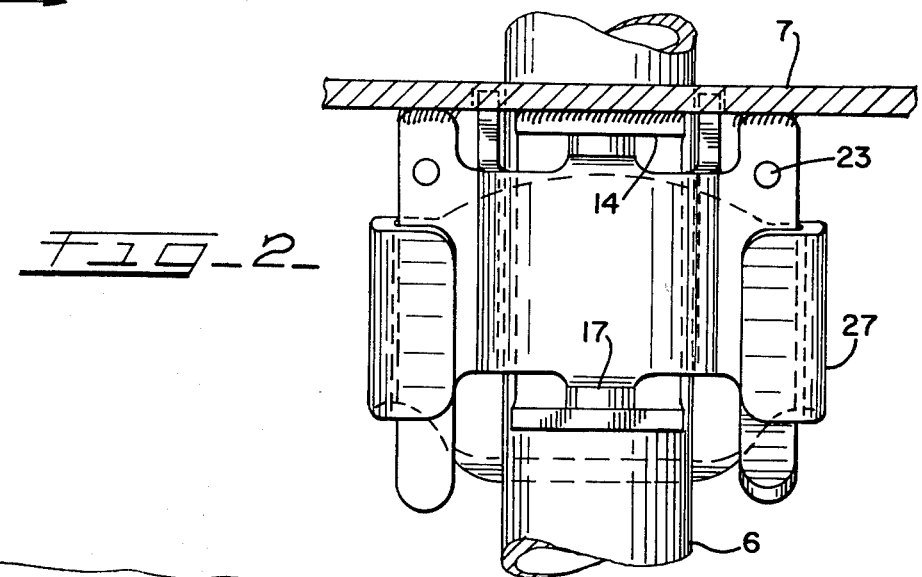
FIG_2_
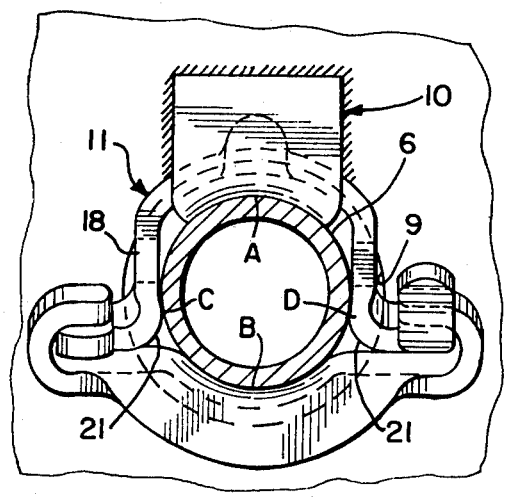
FIG_3_

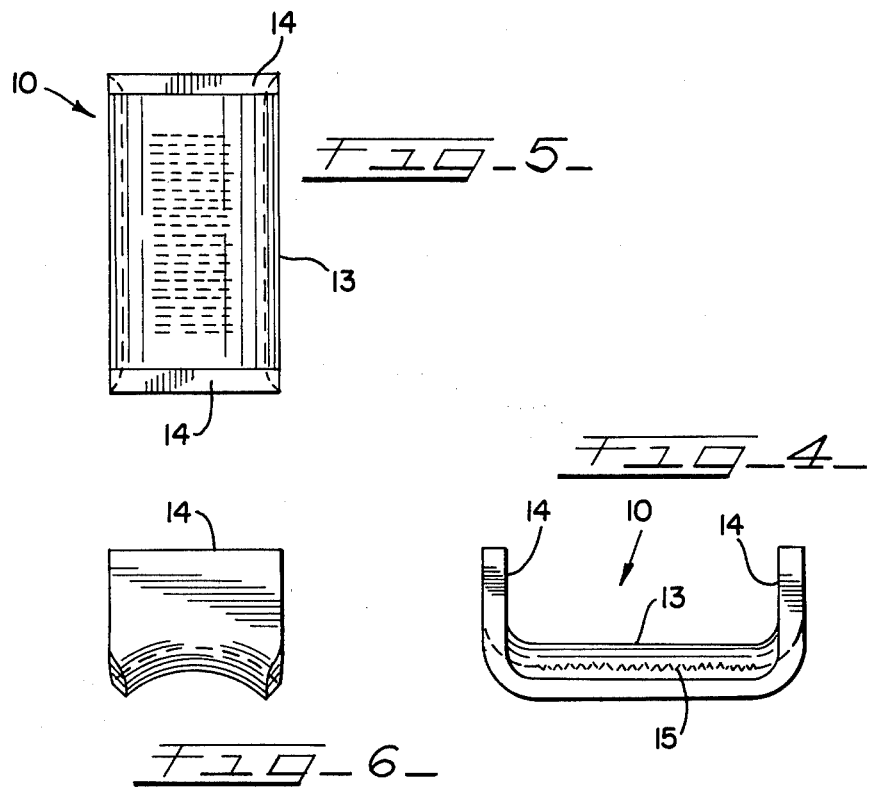
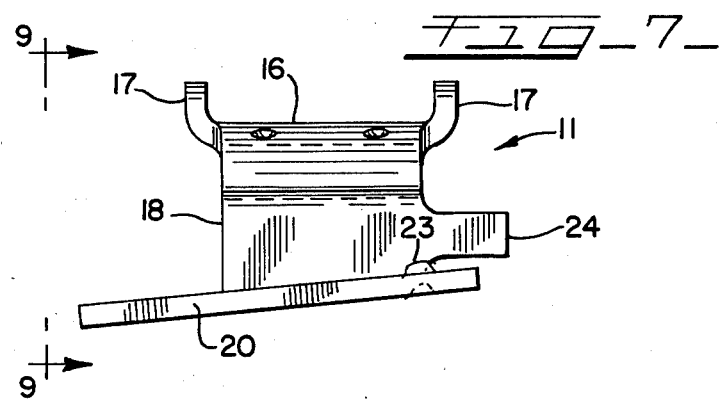

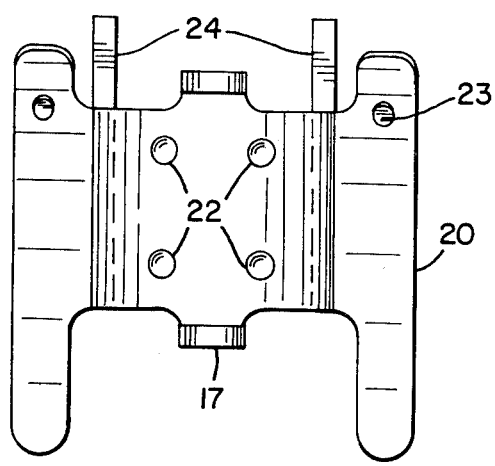
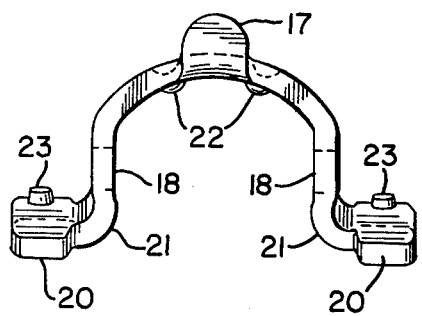
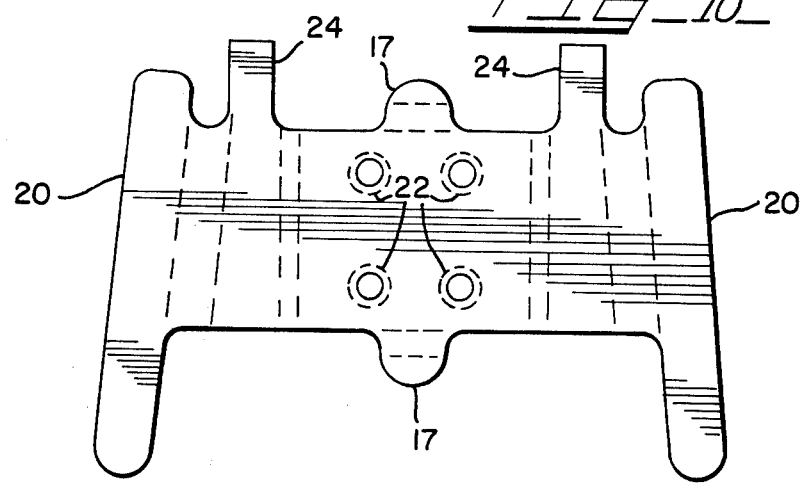
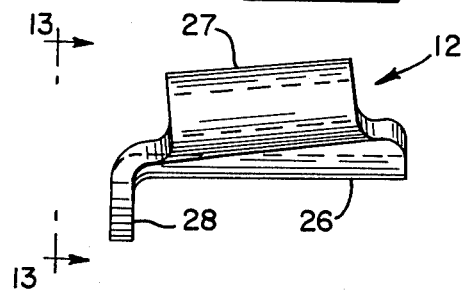

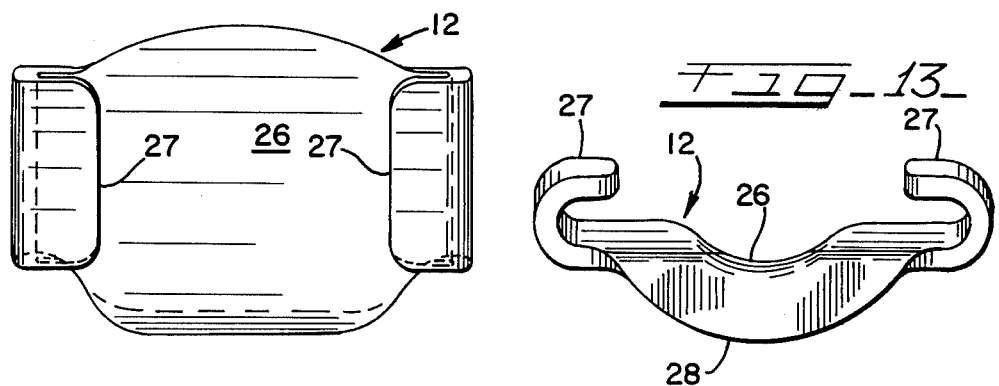
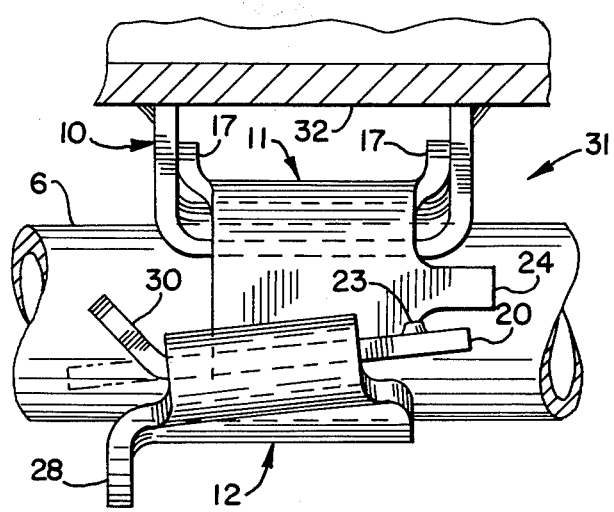
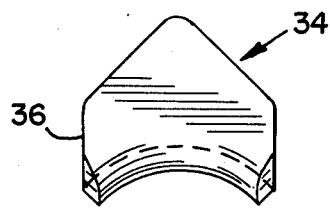
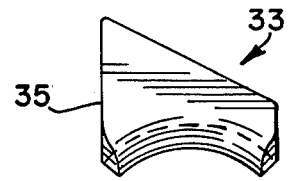

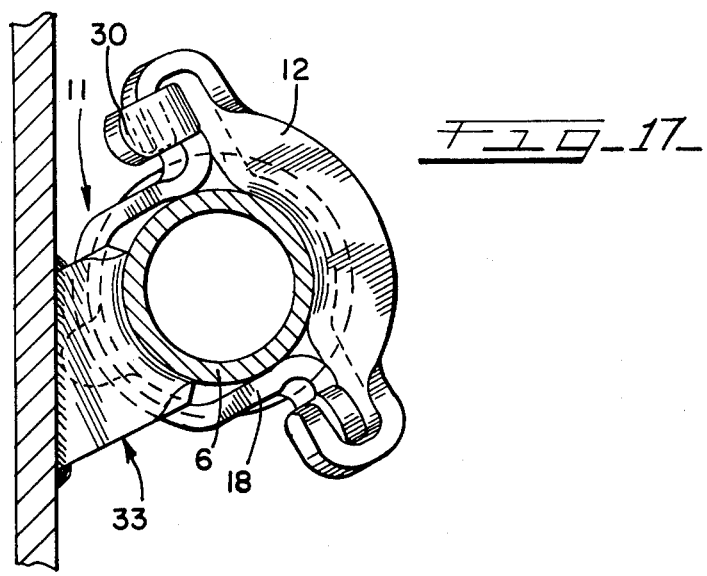
FIG_17_
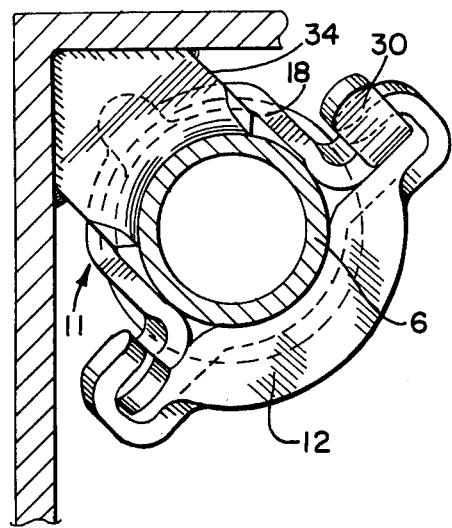
FIG_18_

1

PIPE ANCHOR

This invention relates, generally, to improvement in pipe anchors of the type used for anchoring pipes or conduits to structural members, particularly in the underframes of railway cars. Pipe anchors of this general type are known and one particular example of such a pipe anchor is disclosed in U.S. Pat. No. 2,546,792 dated Mar. 27, 1951.

The pipe anchor of the present invention comprises three parts which are economical to produce in high-volume by known low-cost stamping and forming techniques. The pipe anchors of the present invention provide four-point support for the pipes that are embraced or anchored thereby, whereas, the pipe anchors of U.S. Pat. No. 2,456,792 provide two-point support.

In the pipe anchors of the present invention the three parts comprise an adapter, a base, and a clamp. In order to obtain different types, and provide for different arrangements of, anchoring to a variety of structural members, it is only required to have different adapters in the present three-part pipe anchors of the present invention without changing the base and clamp members. In the pipe anchors of U.S. Pat. No. 2,546,792 neither of the two parts is altered and they permit only two or three methods of mounting to structural members, thus placing limitations on the extent to which such prior pipe anchors can be used.

The object of the present invention, generally stated, is the provision of pipe anchors for anchoring pipes to various structural members particularly those in the underframes of railway cars and characterized in: comprising three parts; being highly versatile in use and allowing the pipe anchors to be used in a wide variety of situations; having two of the three parts remain unchanged while the third part is made in various styles involving only minor modification; being producable in volume at low cost by well-known stamping and forming techniques on widely available equipment; being easily installed; and, providing four-point support to pipes anchored thereby.

Certain other objects of the invention will be obvious from the following detailed description of the presently preferred embodiment thereof.

IN THE ACCOMPANYING DRAWINGS

FIG. 1 is a fragmentary side elevational view showing a pipe anchor forming an embodiment of the present invention installed so as to anchor a horizontal length of pipe passing through an opening in a vertical structural member such as a cross bearer in a rail car underframe.

FIG. 2 is a top plan view of the installation shown in FIG. 1. FIG. 3 is an end elevational view taken on line 3—3 of the installation shown in FIG. 1.

FIG. 4 is a side elevational view of the adapter which forms one part of the pipe anchor in the installation shown in FIGS. 1-3.

FIG. 5 is a top plan view of the adapter shown in FIG. 4.

FIG. 6 is an end elevational view of the adapter shown in FIG. 4.

FIG. 7 is a side elevational view of the base comprising a second part of the three-part pipe anchor shown in FIGS. 1-3.

FIG. 8 is a top plan view of the base shown in FIG. 7.

FIG. 9 is an end elevational view taken on line 9—9 of FIG. 7.

FIG. 10 is a plan view of a blank from which the base of FIGS. 7-9 may be formed.

FIG. 11 is a side elevational view of the clamp forming one part of the pipe anchor shown in FIGS. 1-3.

FIG. 12 is a top plan view of the clamp shown in FIG. 11.

FIG. 13 is an end elevational view taken on line 13—13 of FIG. 11.

FIG. 14 is a fragmentary side elevational view of the pipe anchor of FIG. 1 mounted on the underside of a structural or frame member.

FIGS. 15 and 16 are end elevational views similar to FIG. 6 showing modified adapters that may be substituted in the pipe anchor of FIG. 1.

FIG. 17 is an end elevational view illustrating the use of the adapter of FIG. 15.

FIG. 18 is an end elevational view illustrating the use of the adapter of FIG. 16.

Referring to FIG. 1 a three-part pipe anchor forming one illustrative embodiment of the present invention is indicated generally at 5 and is shown anchoring a horizontal length of pipe 6 to a vertical frame or structural member 7 having an opening 9 therein through which the pipe 6 extends. The structural member 7 can, for example, be a cross bearer in the underframe of a railway car and the pipe 6 can be an air line or other train pipe.

The pipe anchor 5 is comprised of three parts, namely, an adapter 10, a base 11 and a clamp 12. Each of these three parts will be described in connection with FIGS. 4-6, 7-10 and 11-13, respectively, and then the manner in which the parts are assembled and mounted as shown in FIG. 1-3 will be described.

Referring to FIGS. 4-6, the adapter 10 comprises a pipe-engaging axial section 13 of a cylinder with vertical upturned ends 14—14. The radius of curvature of the section 13 will be such as to correspond to that of the pipe 6 so that the section 13 will seat thereon as shown in FIG. 3. It will be seen that the adapter 10 may be readily stamped from a flat blank. If desired, the under surface of the pipe-engaging pipe axial section 13 may be scored or otherwise mutilated as indicated at 15 so as to more firmly engage and anchor the pipe 6.

Referring to FIGS. 7-10, the base 11 is generally saddle-shaped and comprises a seat portion 16 which has a radius of curvature such as to fit and seat firmly on the upper surface of the pipe-engaging portion or section 13 of the adapter 10. On the opposite ends of the seat portion 16 are up-turned tabs 17—17 which engage the up-turned ends 14—14 of the adapter 10 as shown in FIGS. 1 and 2. The base 11 has downwardly depending side portions 18—18 from the lower end of each of which extend outwardly turned inclined flanges 20—20. Preferably, the lower ends of the sides 18 of the base 11 are formed with inwardly projecting longitudinal ribs 21—21 which fit just under the horizontal diameter of the pipe 6 as shown in FIG. 3.

The seat portion 16 of the base 11 is formed with four resistance welding projections 22—22 whereby the base 11 may be rigidly secured to the adapter 10. The inclined flanges 20 are provided on their upper ends with stops 23—23. Also, to assist in installation and assembly, the base 11 is provided with a pair of vertical tabs 24—24 adjacent the upper ends of the flanges 20.

A flat blank is indicated generally at 25 in FIG. 10 from which the base 11 of FIGS. 7–9 can be readily formed by stamping procedures of known type.

Referring to FIGS. 11–13, the clamp 12 is indicated therein as having a pipe-engaging cradle 26 which has a radius of curvatures such as to conform to the under side of the pipe 6. The cradle 26 has upwardly extending therefrom on opposite sides a pair of inclined inwardly opening channels 27—27. At the end of the cradle section 26 adjacent the lower end of inclined channels 27 there is a downwardly turned flange 28 which provides an element which may be used in the assembly and installation of the pipe anchor 5 as will be described below.

Referring now to FIGS. 1–3, the method in which the pipe anchor 5 may be installed to rigidly secure or anchor the pipe 6 to the vertical structural member 7 will be described. Normally, the adapter 10 and base 11 will be pre-assembled by the manufacturer by projection welding at projections 22 prior to shipment. One of the upwardly extending flanges 14 of the pre-assembly will be positioned against the member 7 above the opening 9 and welded thereto along the top and two vertical edges as indicated in FIG. 3. The tabs 24 are then welded to the member 7 adjacent the hole 9 as indicated in FIGS. 1 and 2. Likewise, the upper ends of the flanges 20 will be welded to the member 7 as shown in FIGS. 1 and 2. The pipe 6 may now be inserted through the hole 9 and through the pre-assembly so as to be gripped on opposite sides by the ribs 21 and thereby hold the pipe in place while the clamp 12 is applied. The next operation is to put the clamp 12 in place. This is done by sliding the upper ends of the channels 27 over the lower ends of the flanges 20 and then forcing the clamp 12 toward the vertical structural member 7. The downwardly depending flange 28 may be relied on for purpose of driving the clamp 12 inwardly until it is adequately forced into place. In so doing, the channels 27 of clamp 12 cam against the flanges 20 and draw the opposite downwardly depending sides 18 of the base 11 downwardly and inwardly into embracing relation against the sides of the pipe 6 as shown in FIG. 3. The stops 23 will prevent the clamp 12 from being driven too far.

After the clamp 12 has been driven or forced in toward the structural member 7 sufficiently the lower projecting ends of the flanges 20 are bent as indicated at 30 so as to lock the clamp 12 in place.

From FIG. 3 it will be seen that the pipe 6 is embraced by the pipe anchor 5 at A, B, C, and D, so as to have four-point support thereby firmly resisting displacement from any side or direction.

In FIG. 14, a three-part pipe anchor 31 corresponding to pipe anchor 5 of FIG. 1 is shown mounted to the underside of a horizontal structural member 32. In the installation the upper edges of the upturned ends or flanges 14 on the adapter 10 are welded to the member 32. It will be seen from FIG. 14 that the stops 23 will serve to prevent the clamp 12 from being driven too far onto, or even off, the flanges 20.

In FIGS. 15 and 16 adapters 33 and 34 are shown which correspond to adapter 10 except for having differently shaped upturned ends or flanges 35 and 36, respectively. These different shapes provide different welding edges which lend themselves to being welded in different settings. Thus, the adapter 33 is suited for anchoring a pipe on a vertical surface as shown in FIG. 17 while adapter 34 is suited for anchoring a pipe in a corner of an angle member as shown in FIG. 18.

It will be understood that the components of the pipe anchors 5 and 31 may be formed of steel, aluminum, or other suitable material.

We claim:

1. Pipe anchor means for embracing and anchoring pipes to structural members comprising: an adapter; a base; and a clamp; said adapter being in the form of a pipe-engaging axial section of a cylinder and having upturned flanges at opposite ends thereof; said base being in the form of a saddle having a seat portion fitting on said adapter, upturned ends of said saddle engaging said upturned flanges of said adapter, and depending pipe-embracing side portions having out-turned inclined longitudinal flanges; and, said clamp being in the form of a pipe-engaging cradle portion having a pair of inclined inwardly opening channel formations adapted to slidably receive therein said out-turned inclined longitudinal flanges and by cam action draw said depending pipe-embracing side portions of said base and said pipe-engaging axial section of said adapter and said cradle portion of said clamp into generally equi-spaced four-point embracing support of said pipe.

2. The pipe anchor means of claim 1 wherein each of said upturned flanges on opposite ends of said adapter has a horizontal top edge and vertical side edges providing square corners at opposite ends of each horizontal top edge.

3. The pipe anchor means of claim 1 wherein said upturned flanges on opposite ends of said adapter are peaked at the top.

4. The pipe anchor means of claim 1 wherein said upturned flanges on opposite ends of said adapter have two vertical side edges interconnected at their upper ends by an inclined top edge.

5. The pipe anchor means of claim 1 wherein said seat portion of said base has on the underside thereof a plurality of resistance welding projections.

6. The pipe anchor means of claim 1 wherein each of said depending pipe-embracing side portions of said base has a vertical tab projecting in the direction of upward inclination of said out-turned inclined longitudinal flanges.

7. The pipe anchor means of claim 1 wherein at least one of said out-turned inclined longitudinal flanges on said base has a stop projection adjacent its upper end.

* * * * *